Oct. 10, 1967     P. H. MILLER, JR., ET AL     3,346,066
METHOD OF AND APPARATUS FOR GENERATING SEISMIC WAVES
Filed July 13, 1964     4 Sheets-Sheet 2
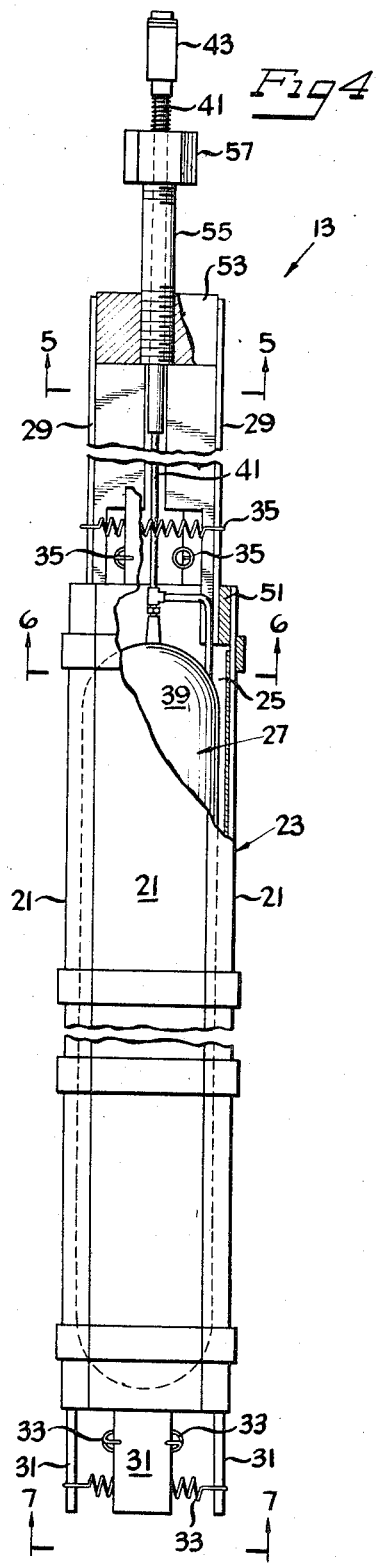
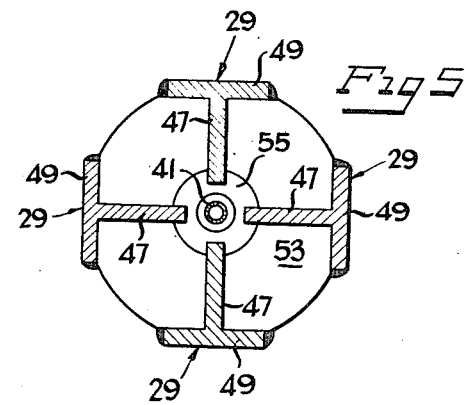
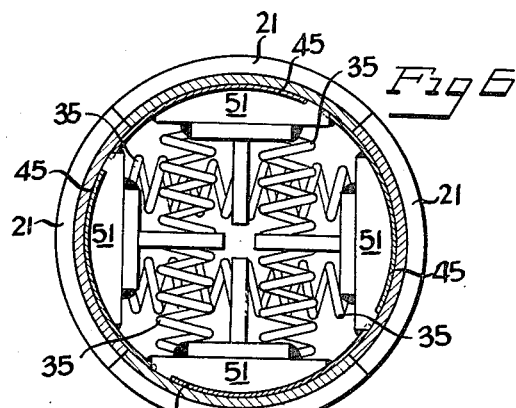
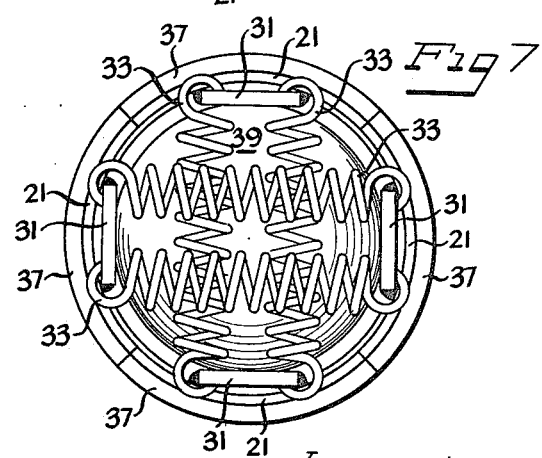
INVENTORS
PARK H. MILLER, JR.
DWIGHT C. POUND
HERSCHEL R. SNODGRASS
BY Anderson, Luedeka, Fitch, Even & Tabin
Atty's Oct. 10, 1967   P. H. MILLER, JR., ET AL   3,346,066
METHOD OF AND APPARATUS FOR GENERATING SEISMIC WAVES
Filed July 13, 1964                           4 Sheets-Sheet 4

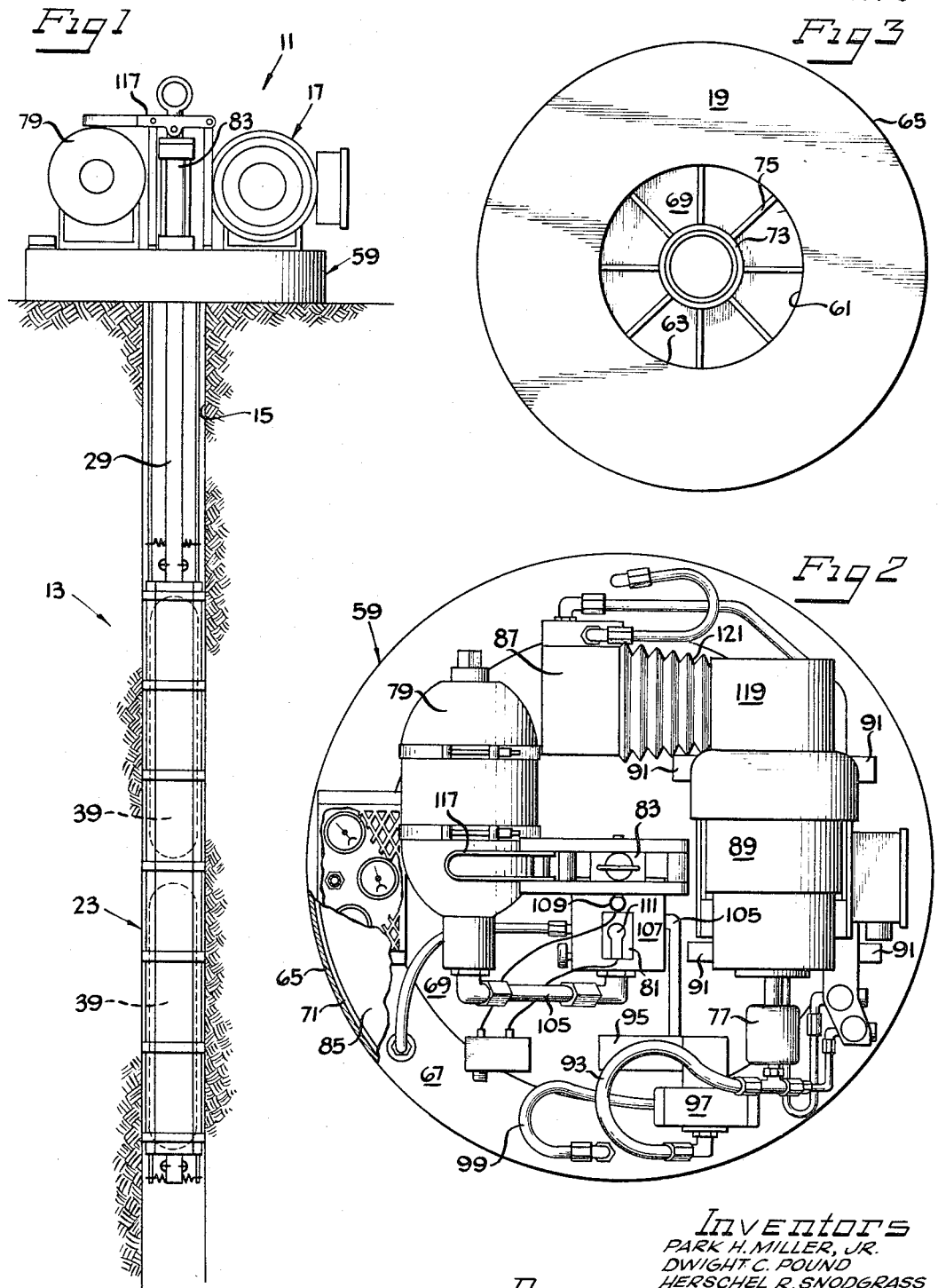

INVENTORS
PARK H. MILLER, JR.
DWIGHT C. POUND
HERSCHEL R. SNODGRASS
By Anderson, Luedeka, Fitch, Even & Tabin
Atty's 3,346,066
METHOD OF AND APPARATUS FOR
GENERATING SEISMIC WAVES
Park H. Miller, Jr., Del Mar, Dwight C. Pound, Solana
Beach, and Herschel R. Snodgrass, San Diego, Calif.,
assignors to General Dynamics Corporation, New York,
N.Y., a corporation of Delaware
Filed July 13, 1964, Ser. No. 382,304
The portion of the term of the patent subsequent to
Nov. 1, 1983, has been disclaimed
3 Claims. (Cl. 181—.5)

The present invention relates generally to apparatus adapted for use in seismic surveying and, more particularly, to apparatus adapted to generate seismic waves in the earth.

In certain forms of geophysical prospecting in which it is desired to determine the subsurface structure of the earth, seismic waves are generated in the earth so as to be reflected by subsurface layers. These reflected waves are recorded and, when properly interpreted, indicate the configuration and depth of the layers. This information, in turn, provides certain indications of the mineral or oil content of the earth. The generated seismic waves are conveniently introduced into the earth by the application of forces of considerable magnitude, such forces being produced either by the detonation of explosives, through the movement of very large weight masses, or by hydraulic pressure.

The production of seismic waves incident to the detonation of explosives has many inherent disadvantages. In the first place, the explosion frequently renders the surrounding portion of the earth unsuitable for similar subsequent wave generation either because it produces a hole of considerable size or because it alters the surrounding earth structure to a point where the results of subsequent wave propagation would not be the same as the results of the initial wave propagation. Also, there is little or no control over the frequencies of sound waves generated by explosives, and the consequent reflections are of such varied frequencies that the results cannot easily be interpreted. Furthermore, explosives, in addition to generating subsurface waves, also generate large surface waves which disturb the recording equipment, thus making it difficult to obtain the desired information.

In systems in which waves are generated by the movement of large masses, there is great difficulty in transporting the necessary equipment between various locations and the number of areas which can be tested is thus limited. Also, such sources are only usable on the surface and cannot be utilized below the surface.

Certain systems have been provided which utilize hydraulic power. However, those systems which are available either couple the use of such power to the manipulation of weights, thus incorporating into their operation those disadvantages previously set forth, or are capable of only a single rather than repetitive pulse generation. Also, some such systems which abruptly release a massive pent-up hydraulic or pneumatic force tend to excite natural resonances in the earth.

Accordingly, it is the principal object of the present invention to provide an improved apparatus for generating seismic waves.

Another object of the invention is to provide such an apparatus which is coupled to the earth in an improved and more efficient manner.

A further object of the invention is to provide an improved device for generating controllable and programmable seismic waves in the earth to produce a signal which may be varied and which is completely reproducible so as to permit data correlation techniques to be applied to improve signal-to-noise ratios in difficult seismic situations.

A still further object of the invention is to provide an improved device for generating consecutive seismic waves in the earth at any one of a plurality of frequencies within a broad range.

Other objects and advantages of the invention will become apparent with reference to the following description and the accompanying drawings.

In the drawings:

FIGURE 1 is a side elevational view of an apparatus showing various of the features of the invention as the apparatus might appear in operative position in a hole provided in the earth;

FIGURE 2 is an enlarged partially broken away plan view of the apparatus of FIGURE 1;

FIGURE 3 is an enlarged bottom view of a portion of the apparatus of FIGURE 1;

FIGURE 5 is an enlarged sectional view taken along line 5—5 of FIGURE 4;

FIGURE 6 is an enlarged sectional view taken along line 6—6 of FIGURE 4;

FIGURE 7 is an enlarged bottom view of the apparatus of FIGURE 4 viewed in the direction of the arrows 7—7 of FIGURE 4;

FIGURE 8 is a diagrammatic view of the hydraulic system of the device of FIGURE 2;

Figure 4:
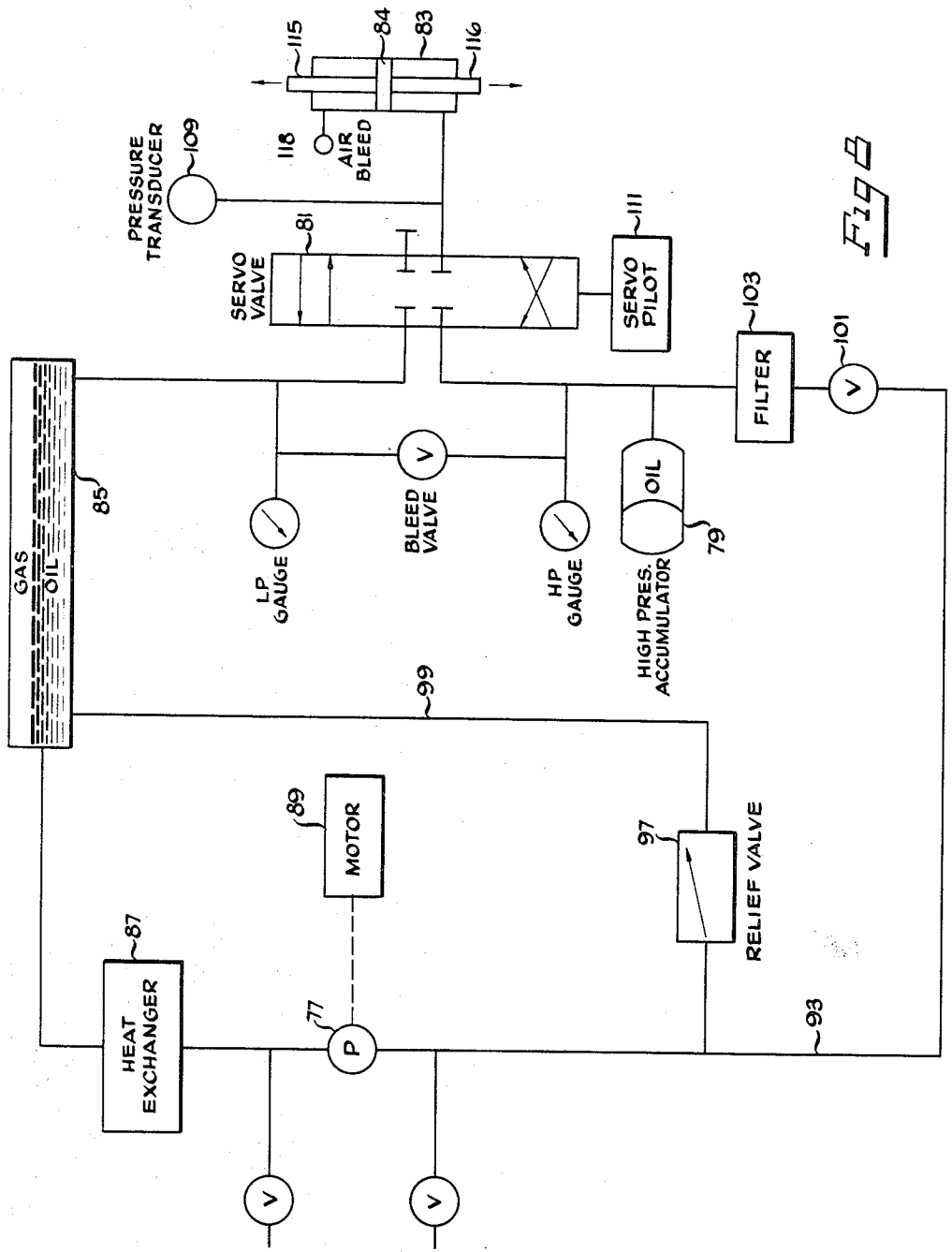
FIGURE 4 is an enlarged, partially broken away, elevational view of the lower portion of the apparatus of FIGURE 1.

Very generally an apparatus 11 constituting a principal embodiment of the present invention is shown in FIGURES 1 through 8 of the drawings and includes an anchor 13 which is adapted to be firmly secured in a suitable vertical hole 15 in the earth. The upper end of the anchor 13 extends above the surface of the earth and is attached to a hydraulic power system 17 supported by a force plate 19 which rests upon the surface of the earth adjacent the upper edge of the hole 15. The power system 17 interconnects the force plate 19 and the anchor 13 and is effective to exert forces tending to move the plate and anchor in the direction of each other. However, since the anchor 13 is immovably embedded in the earth, the forces urge the force plate downwardly, thus placing the earth in compression. The forces are then at least partially released to relax the compression and generate a seismic wave. This cycle is repeated in rapid succession at a selected frequency of occurrence to generate a plurality of waves, thereby providing a large quantity of seismic energy for recording and processing.

More specifically, the anchor 13 comprises a set of shoes 21 interconnected for movement toward and away from one another and arranged to form a hollow generally cylindrical section 23 having a diameter slightly less than that of the hole 15. In the illustrated embodiment, four shoes are provided, but the use of a greater or lesser number might also be satisfactory under certain conditions. The shoes define an inner compartment 25 within the cylindrical section 23 adapted to receive an inflatable bladder 27, which, when inflated, causes the shoes to move away from one another into pressure engagement with the side walls of the hole 15, thereby immovably securing the section 23 in place. The cylindrical section is connected to the power system 17 by means of tension bars 29 to make possible the transmission of forces between the anchor and force plate, as previously set forth.

Referring now to the construction of the anchor in greater detail, each of the shoes 21 is in the form of an elongated rigid plate of arcuate transverse cross-sectional configuration which constitutes, in effect, a segment of a hollow cylinder or pipe. Accordingly, when four of the shoes 21 are arranged about a common axis, they form the hollow cylindrical section 23 previously referred to. Each shoe has a short elongated plate 31 projecting outwardly from its lower end. Tension springs 33 extend between the plates 31 of the shoes and are effective, together with additional tension springs 35 connected to the tension bars 29, to bias the shoes toward one another into their most compact or collapsed position. In addition, the outer surface of each shoe has secured thereto a number of longitudinally spaced arcuate metal strips or cleats 37 which extend transversely of the shoe and serve to embed themselves in the wall of the hole 15 when the anchor is expanded, thus enhancing the holding ability of the anchor. If desired, reinforcing bars (not shown) extending longitudinally of the shoes may also be secured thereto to provide additional strength.

The four shoes 21, when arranged about a common axis, define the inner compartment 25 adapted to receive the bladder 27 which, in the illustrated embodiment, comprises a pair of elongated sacs 39 formed of a durable, fluid-impervious, flexible material. Each sac is reinforced at its ends which receive no support from the shoes so as to enable them to withstand the pressures to which the bladder is subjected. The pair of sacs 39 are arranged in longitudinal alignment and are suitably connected to a common conduit 41 of sufficient length to extend to a source of fluid under pressure (not shown) such as a gas in the form of dry nitrogen or compressed air supported at ground level above the hole 15. The upper end of the conduit is provided with a suitable quick disconnect 43 to facilitate connection to the gas source.

It will be appreciated that the introduction of gas under pressure into the bladder 27 causes the sacs 39 to expand and, in so expanding, to urge the shoes 21 away from one one another against the force of the biasing springs 33 and 35 and into engagement with the side walls of the hole, thus frictionally maintaining the anchor in the hole. However, this engagement also causes the cleats 37 on the outer surfaces of the shoes to become embedded in the side walls of the hole, thereby greatly increasing the holding ability of the anchor. When the pressure within the bladder is relieved, of course, the springs return the shoes to their original position, thereby collapsing the cylindrical section 23 and permitting the anchor to be easily removed from the hole.

As the bladder is inflated and the shoes move away from one another, gaps are created between the longitudinal edges of the shoes large enough for portions of the bladder 27 to enter. This could enable the bladder to contact the side walls of the hole 15 which, in certain terrain, might be sufficiently rough to puncture the walls of the bladder. Also, if the bladder were allowed to enter such gaps, it might become pinched when the pressure within the bladder was relieved and the shoes were moved back into their initial and close-fitting position incident to the biasing force of the springs.

Accordingly, a leaf member 45 in the form of a curved plate is secured as by welding to one of the longitudinal side edges of each shoe 21, the leaves being approximately the length of the bladder 27 and being so arranged relative to the four shoes that the gaps which occur between the shoes when the bladder is expanded are effectively closed by the leaves. However, the leaves are positioned in close proximity to the inner surface of the shoes and, because of their location and configuration, do not interfere with the movement of the shoes or pinch the bladder between the shoes and leaves as the bladder is collapsed.

The tension bars 29 which connect the expandable cylindrical section of the anchor to the power system 17 are formed of heavy stock of T-shaped cross-sectional configuration (T-bars) and include a web 47 and a cross member 49. The T-shaped cross section renders the bars resistant not only to extension, which would be a source of considerable energy loss, but also renders them resistant to a bow-string type vibration at high frequencies. Each rod is connected to one of the shoes by means of a plate 51 having a flat surface to which the cross member of the rod is welded, and having a curved surface which is welded to the inner surface of the shoe adjacent its upper end. The provision of a separate tension bar for each shoe permits the bar to flex some as the shoe is driven outwardly against the wall of the hole incident to the inflation of the bladder 27.

The webs 47 of the T-bars 29 are cut away adjacent the upper ends of the bars to permit attachment of the cross member 49 of each bar to one face of a common, generally round collar block 53 positioned centrally of the bars 29. The block 53 is provided with a central threaded hole which receives one end of a heavy-walled tube 55, the tube being threaded at its opposite end to receive a nut 57 by means of which it is secured to the power system 17. The conduit 41 of the bladder 27 passes outwardly through the central bore of the tube 55. Other arrangements are, of course, possible. For example, a quick-disconnect type attachment could be used in conjunction with a flexible conduit that projects laterally from the anchor adjacent the upper end thereof and plugs into a connection provided on the lower surface of the force plate 19.

The power system 17 to which the anchor 13 is connected is mounted on a platform 59 which includes as its base the force plate 19. Accordingly, for every pull or tension force applied to the anchor by the power system 17, there is a reaction force on the force plate 19 tending to urge it downwardly and, thus, place the ground beneath in compression so as to generate a seismic wave. Accordingly, the force plate functions as the principal sound-radiating component of the apparatus 11.

More specifically, the force plate 19 comprises a heavy plate in the form of a ring and includes a central opening 61 which is of a diameter several times greater than that of the hole 15. The plate is disposed so as to lie flat on the ground with its central opening 61 co-axial with the longitudinal axis of the hole 15, it having been found preferable, however, to remove a portion of the spongy top surface of the earth before placing the plate thereon. The provision of the large diameter opening in the center of the plate allows the forces applied to the plate to be located at some distance from the anchor hole so as to avoid collapsing of the soil defining the upper edge of the hole, thereby permitting the apparatus to be utilized for an extended period of time in the same location if desired while permitting the radiated seismic signal to remain unaltered.

Supported on the force plate and secured thereto as by welding is a first cylindrical section 63 having an inner diameter closely approximating the diameter of the central opening of the force plate 19 and arranged co-axial to the opening. A second cylindrical section 65 of equal height and having an outer diameter closely approximating the outer diameter of the plate 19 is positioned concentrically to the first cylindrical section 63 and is fastened to an annular top plate 67 having an outer diameter approximating that of the force plate, the section 65 and plate 67 thereby forming a removable shroud which is bolted in place. A second annular plate 69, positioned within the central opening of the plate 67, is fastened to the upper edge of the cylindrical section 63. The cylindrical sections 63 and 65, the annular plates 67 and 69, and the force plate 19 define an annular compartment 71, the function of which will become apparent shortly. A pipe section 73 is fastened to the lower surface of the top plate and extends downwardly therefrom. Reinforcing ribs 75 having a height approximating that of the cylindrical sections 63 and 65 extend radially from the outer surface of the pipe section 73 to the inner surface of the first cylindrical section 63 and are fastened to each as well as to the plates 19 and 69 to provide structural strength. Similarly, reinforcing ribs (not shown) extend outwardly from the cylindrical section 63 to the outer edge of annular plate 69. These ribs are fastened to cylindrical section 63 and to plates 69 and 19 to provide additional structural strength.

The force generating or power system 17 is adapted to cause a downward force to be exerted by the force plate 19 on the earth and thereby generate a seismic wave in the earth. The system is designed so that a large number of force impulses can be applied consecutively, e.g., 30 consecutive impulses, and so that these impulses can be applied within a very short period of time, e.g., at a frequency of as much as ninety cycles per second. This permits the production of a large quantity of seismic energy for recording and processing.

Moreover, as will become apparent shortly, the system permits selective variation in the frequency over a wide range. This feature makes it possible to provide a series of pulses, each at a different frequency, and to add the recorded waves to achieve a well-defined peak which can then be interpreted to reveal the sub-surface structure. This feature is explained in greater detail in the co-pending application of Park H. Miller, Herschel R. Snodgrass and Dwight C. Pound, filed concurrently herewith for "Geophysical Prospecting."

The force generating or power system 17 comprises generally (see FIGURE 8) a pump 77 which provides a flow of oil under pressure to a high pressure accumulator 79 suitably connected to a servo valve 81. The servo valve controls the flow of fluid to a hydraulic cylinder 83 housing a piston 84 which is suitably connected to the anchor 13. The fluid is exhausted from the hydraulic cylinder 83 to a low pressure accumulator 85 and thence to a heat exchanger 87, from which it is returned to the pump 77.

The power system causes a force to be exerted which places the ground in compression, then causes a portion of the force to be released to generate the seismic wave. However, the system does not release the entire force, thereby maintaining some tension between the force plate and anchor and keeping the ground at least partially in compression. This prevents the force plate from "slapping" the ground with a resultant loss of energy, and maintains the ground in compact condition for more efficient transmission of seismic waves. The power system is capable of maintaining a certain minimum degree of compression on the ground at all times, but may of course be suitably modified to provide a greater or lesser degree of compression as desired.

More specifically, and with reference to FIGURES 2 and 8, the pump is preferably of a type which is capable of discharging at high pressure, i.e., pressures of the order of 5,000 pounds per square inch, but need not be a high capacity pump if it is desired to economize on power. The pump should be capable, however, of recharging the high pressure accumulator in a short period of time after a series of force impulses. The pump of the illustrated embodiment is mounted directly to the shaft of a motor 89 to conserve space and eliminate the need for a separate connecting means. Preferably, a shock absorber 91 is provided between the motor and pump and the platform to prevent injury to those units from the vibrations of the system.

The pump discharges into a conduit 93 leading to a manifold 95 (FIGURE 2) providing communication to a relief valve 97. The relief valve 97 allows sufficient fluid to pass into the system through a suitable passageway in the manifold 95 to build up the system pressure to a predetermined amount. Excess fluid over that required to maintain this pressure is bled back to the low pressure side of the system by a conduit 99 leading directly to the low pressure accumulator 85. The fluid which flows past the relief valve 97 during the pressure build-up goes directly to a check valve 101 and then to a fine oil filter 103, each of which is located in the manifold 95 (FIGURE 2). The check valve prevents back flow, which might rupture the oil filter.

The filtered oil is stored in the high pressure accumulator 79 which permits the use of a smaller pumping system. More specifically, a small pumping system operating continuously to charge the accumulator is equivalent to a system of greater capacity operating intermittently to supply the periodic high flow rates needed to operate the apparatus. In the preferred embodiment, the high pressure accumulator is of the bladder type utilizing a gas such as nitrogen under pressure. The high pressure oil from the check valve 101 and filter 103, and from the high pressure accumulator 79, is supplied through suitable conduits 105, to a second manifold 107 which is connected to the electro-hydraulic servo valve 81.

The servo valve controls the flow of fluid to the hydraulic cylinder 83 and is connected to a pressure transducer 109 which is electrically connected to the system control and provides a feedback voltage to a servo pilot 111 which controls the operation of the servo valve. This feature is described in detail in the co-pending application of Dwight C. Pound, filed concurrently herewith for "Control Apparatus for Seismic Sources." The servo pilot 111 is electrically connected to the system control so that a signal such as a square wave of any selected frequency can be applied to it. The signal is effective to cause the servo valve 81 to operate at the selected frequency and thus cause force impulses to be applied to the earth at that frequency. The servo valve preferably has a high frequency response of at least 100 cycles per second and a capacity of approximately 10 gallons per minute so as to enable the system to undergo repeated cycles in a relatively short time interval.

The hydraulic cylinder 83 is mounted directly on the top plate 67 of the platform 59 and carries the piston 84 therein having piston rods 115 and 116 extending from its upper and its lower faces respectively. The lower rod 116 is adapted to be connected to the anchor 13, while the upper rod is connected to a mechanism 117 which can be used to maintain the piston 84 and, hence, the anchor 13, in its lowermost position relative to the force plate 19 as the apparatus is being positioned relative to the hole 15, thereby theoretically at least permitting the greatest possible relative movement between the force plate 19 and the anchor 13 in the direction of one another. The mechanism 117 also provides a load against which the power system 17 can be operated, as for testing or evaluation, when the anchor is not attached. Accordingly, when the piston is drawn upwardly, an upward force is applied to the anchor and a downwardly directed reaction force is applied to the platform 59 and hence to the force plate 19. The spring action of the earth under force provides the return action on the piston, which is vented to the atmosphere as at 118 on the side adjacent the upper rod 115.

The servo valve-hydraulic cylinder arrangement is preferably operated so that the full supply pressure is maintained on the cylinder. The pressure is then vented off and reapplied with appropriate timing controlled by the frequency of the wave applied to the servo pilot 111 to cause the apparatus to produce the desired number of pulses at a selected frequency. The oil vented off the cylinder is exhausted to the second or low pressure accumulator 85 which is toroidal in shape and is disposed within the annular compartment 71 of the platform 59. The low pressure accumulator utilizes a gas-oil interface and acts as a reservoir for the entire hydraulic system.

The low pressure accumulator discharges through the heat exchanger 87 back to the pump 77. Accordingly, the low pressure accumulator 85 assists in the cooling of the oil by effecting a mixing of the oil with a large volume of relatively cooler oil and, in conjunction with the relief valve 97, by permitting a constant circulation of oil through the heat exchanger 87. The low pressure accumulator also provides a means of absorbing the hydraulic shock and an expansion volume for the oil as it thermally expands and contracts. The heat exchanger utilizes a blower 119 which forces air into the heat exchanger through a flexible duct 121. The blower is powered by a connection to the shaft of the pump motor 89.

In the operation of the apparatus 11, the hole 15 is provided in the earth by suitable boring and drilling tools. The anchor 13 with the platform 59 and power system 17 attached is then placed in the hole with the force plate 19 in abutting relation to the top surface of the earth surrounding the hole. The bladder 27 is then inflated, causing the sacs 39 to expand so as to expand the anchor section 23, thereby forcing the anchor shoes 21 into pressure contact with the sides of the hole and causing the cleats 37 to become embedded therein.

Fluid under pressure is then supplied to the hydraulic cylinder which tends to draw the anchor upwardly, but, since the anchor is rigidly secured in the earth, causes the force plate to be urged downwardly, thereby placing the earth in compression by squeezing it between the anchor and force plate as opposed to applying a heavy blow to the ground as with some previously available apparatus. A signal having a selected frequency of between 18–90 cycles per second is then supplied to the servo pilot 111 which actuates the servo valve 81 so as to cause the pressure within the hydraulic cylinder to be successively released and then restored so as to generate seismic waves at that frequency. Preferably, however, less than all of the pressure is released so that the ground surrounding the hole 13 is at least partially in compression at all times, as previously mentioned.

*Example*

An apparatus is provided for generating a seismic wave and utilizes for its operation a hole 6 inches in diameter and 9 feet in depth. The anchor of the apparatus includes shoes formed by dividing a tube having a 5 inch diameter and a wall thickness of 0.188 inch into four segments of 5 foot length and a width equal to one-fourth the circumference of the tube. Seven cleats 1 inch in width and 0.27 inch in thickness are secured to the outer surface of each shoe in spaced relation to one another.

A bladder comprising a pair of sacs, each approximately 20 inches in length and having normal operating pressure of 80 pounds per square inch, are placed in the compartment defined by the shoes and, when inflated to their normal operating pressure, provide a force of 42,000 pounds pressing the shoes against the sides of the hole. Assuming a typical coefficient of friction for steel on earth of about 0.3, the holding force of the anchor then becomes 12,000 pounds. However, this force is greatly increased by the presence of the cleats.

Tension bars connecting the cylindrical section of the anchor to the power system are 4 feet in length and have a T-cross section 1½ inches in each dimension and ¼ inch thick. A hydraulic power system is provided which includes a high pressure hydraulic pump having seven pistons and rated at 0.7 gallon per minute at 5000 p.s.i. with 200 SSU oil. The pump is driven by a 1½ horse power, 220/440 volt, 3 phase, 60 cycles totally enclosed fan-cooled motor. The pump discharges through a relief valve, a stainless steel ball check valve, and a filter to a high pressure accumulator having a capacity of 2½ gallons. The accumulator, which is of the bladder type, is gas precharged to 1500 p.s.i., and has a normal operating pressure range from 3000 to 3500 p.s.i. It is capable of providing a train of about 36 pulses with a 10% drop in supply pressure in normal soils.

An electro-hydraulic servo valve controls the flow between the high pressure accumulator and the hydraulic cylinder and is basically a high performance 2-stage closed center, four-way sliding spool valve rated at 10 gallons per minute with a 1000 p.s.i. drop across the valve. It is capable of operating at 120 cycles per second. The hydraulic cylinder has a 2½ inch inner diameter and carries a piston having a 1⅜ inch piston rod at each end. The hydraulic cylinder discharges into a low pressure accumulator which is toroidal in shape and has a 4 inch thickness, a ⅛ inch thick wall, and a centerline diameter of 37½ inches. The heat exchanger is capable of distributing the full pump output as heat in 120° ambient air while holding the oil temperature to 150° F.

Figure 9:
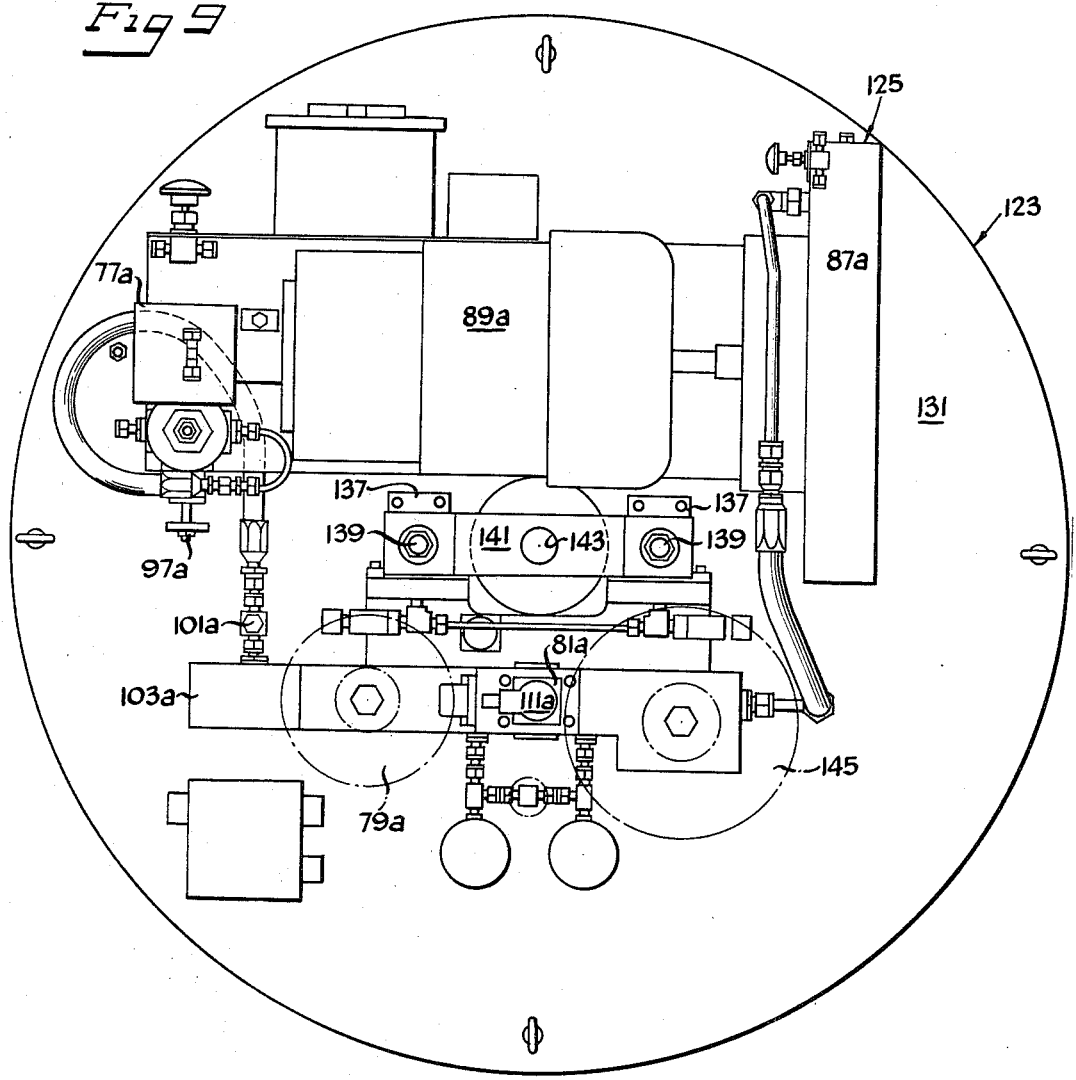
FIGURE 9 is an enlarged plan view similar to that of FIGURE 2 but showing an alternate embodiment of the apparatus.
Figure 10:
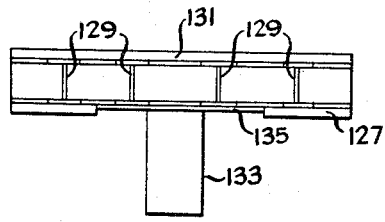
FIGURE 10 is an elevational view on a reduced scale of a portion of the apparatus of FIGURE 9.

An alternate embodiment of portions of the apparatus 11 is shown in FIGURES 9 and 10 and includes a modified platform 123 and modified power system 125. The platform 123 includes a force plate 127 identical to the force plate 19 having a mesh of I-beams 129 welded to its upper surface to stiffen it and distribute the forces across it. A second circular or top plate 131 welded to the upper surface of the mesh of I-beams provides further stiffening and, together with the force plate 127 and the I-beams 129, comprises the aforementioned platform 123.

In order to maintain the platform in a fixed position relative to the hole 15 and in order to reinforce the top portion of the hole, a pipe 133 is secured to the central portion of the lower surface of the top plate 131 and extends downwardly past the force plate and into the hole 15 a short distance. The space between the force plate and the pipe is closed by a thin plate 135 to prevent rain water from entering the hole 15.

The power system 125 includes the same basic components as the power system 17, namely, a pump 77a driven by a motor 89a and adapted to discharge through a relief valve 97a, a check valve 101a, and filter 103a into communication with both a high pressure accumulator 79a and a servo valve 81a operated by a servo pilot 111a. The servo valve 81a controls the flow of oil into a hydraulic cylinder system which includes a pair of cylinders 137 rather than a single cylinder as was the case with the power system 17. Each cylinder carries a piston (not shown) having a piston rod 139 which is connected to one end of a heavy bar or yoke 141 having a central opening 143 to receive the tube 55 at the upper end of the anchor 13. The cylinders 137 discharge into a low pressure accumulator 145 which is of the bladder type and in the form of a metal bottle mounted on the platform 123. The low pressure accumulator 145 discharges through a heat exchanger 87a and back to the pump 77a.

An apparatus is thus provided which is capable of generating a plurality of controlled seismic waves at a selected frequency. Moreover, the apparatus provides a choice of frequency over a wide range to thereby facilitate the interpretation of the data obtained from the wave. The unit is compact, easily transportable, efficient and capable of operating with minimal attention.

Various features of the invention are set forth in the following claims.

What is claimed is:

1. An apparatus for generating seismic waves comprising an anchor adapted to be placed in a hole in the earth and to be immovably secured therein, a plate having an opening extending therethrough, said plate being disposed with the axis of said opening generally co-axial with the axis of the hole and being positioned with one of its flat surfaces in face-to-face contact with the surface of the earth surrounding the hole, and means supported on said plate connecting said plate with said anchor through said opening in said plate and effective to repeatedly exert closely spaced successive forces causing said anchor and said plate to be moved in the direction of one another so as to place the earth beneath said plate repetitively in compression, said means comprising a hydraulic cylinder supported by said plate and having a piston connected to said anchor through said opening, a servo valve controlling the flow of fluid under pressure to said hydraulic cylinder, a servo pilot for controlling the operation of said servo valve, said servo pilot being responsive to a signal supplied thereto to cause a series of closely spaced consecutive actuations of said servo valve at the frequency of the signal, a motor driven pump adapted to place fluid in the system under pressure, a high pressure accumulator, means providing fluid communication between the discharge of said pump and said high pressure accumulator and said servo valve, and means providing communication between the exhaust port of said hydraulic cylinder and the inlet of said pump.

2. An apparatus for generating seismic waves comprising an anchor adapted to be placed in a hole in the earth and to be immovably secured therein, a plate having an opening extending therethrough, said plate being disposed with the axis of said opening generally co-axial with the axis of the hole and being positioned with one of its flat surfaces in face-to-face contact with the surface of the earth surrounding the hole, and means supported on said plate connecting said plate with said anchor through said opening in said plate and effective to repeatedly exert closely spaced successive forces causing said anchor and said plate to be moved in the direction of one another so as to place the earth beneath said plate in compression, said means comprising a hydraulic cylinder supported by said plate and having a piston connected to said anchor through said opening, a servo valve controlling the flow of fluid under pressure to said hydraulic cylinder, a servo pilot for controlling the operation of said servo valve, said servo pilot being responsive to a cyclical signal supplied thereto to cause a series of closely spaced consecutive actuations of said servo valve at the frequency of the signal, a motor driven pump adapted to place fluid in the system under pressure, a high pressure accumulator, means providing fluid communication between the discharge of said pump and said high pressure accumulator and said servo valve, a low pressure accumulator, means providing fluid communication between the exhaust port of said hydraulic cylinder and said low pressure accumulator, a heat exchanger, means providing fluid communication between said low pressure accumulator and said heat exchanger, and means providing fluid communication between said heat exchanger and the inlet of said pump.

3. An apparatus for generating seismic waves comprising an anchor adapted to be placed in a hole in the earth and to be immovably secured therein, a plate having an opening extending therethrough, said plate being disposed with the axis of said opening generally co-axial with the axis of the hole and being positioned with one of its flat surfaces in face-to-face contact with the surface of the earth surrounding the hole, and means supported on said plate connecting said plate with said anchor through said opening in said plate and effective to repeatedly exert closely spaced successive forces causing said anchor and said plate to be moved in the direction of one another so as to place the earth beneath said plate in compression, said means comprising a hydraulic cylinder supported by said plate and having a piston connected to said anchor through said opening, a servo valve controlling the flow of fluid under pressure to said hydraulic cylinder, a servo pilot for controlling the operation of said servo valve, said servo pilot being responsive to a cyclical signal supplied thereto to cause a series of closely spaced consecutive actuations of said servo valve at the frequency of the signal, a motor driven pump adapted to place fluid in the system under pressure, a high pressure accumulator, means providing fluid communication between the discharge of said pump and said high pressure accumulator and said servo valve, a low pressure accumulator, means providing fluid communication between the exhaust port of said hydraulic cylinder and said low pressure accumulator, a heat exchanger, means providing fluid communication between said low pressure accumulator and said heat exchanger, means providing fluid communication between said heat exchanger and the inlet of said pump, and means providing fluid communication between the discharge of said pump and said low pressure accumulator, said latter means including a relief valve adapted to permit the flow of fluid to said low pressure accumulator when the pressure between said pump and said servo valve exceeds a predetermined value.

References Cited

UNITED STATES PATENTS

| | | | |
|---|---|---|---|
| 2,089,983 | 8/1937 | Ricker | 181—.5 |
| 2,271,005 | 1/1942 | Grebe | 175—230 X |
| 2,603,163 | 7/1952 | Nixon | 166—212 |
| 2,806,533 | 9/1957 | Fleck | 181—.5 |
| 2,970,651 | 2/1961 | Roberts | 166—212 |
| 3,064,570 | 11/1962 | Smith | 181—.5 X |
| 3,208,550 | 9/1965 | Castanet et al. | 181—.5 |
| 3,221,833 | 12/1965 | Malmberg | 181—.5 |
| 3,282,371 | 11/1966 | Miller | 181—.5 |

BENJAMIN A. BORCHELT, *Primary Examiner*

SAMUEL FEINBERG, *Examiner.*

G. H. GLANZMAN, *Assistant Examiner.*